(12) United States Patent
Konohara

(10) Patent No.: US 8,122,870 B2
(45) Date of Patent: Feb. 28, 2012

(54) BLOWBY GAS RETURNING APPARATUS

(75) Inventor: Hirokazu Konohara, Inazawa (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 491 days.

(21) Appl. No.: 12/385,250

(22) Filed: Apr. 2, 2009

(65) Prior Publication Data

US 2009/0308364 A1     Dec. 17, 2009

(30) Foreign Application Priority Data

Jun. 17, 2008   (JP) ................................. 2008-157766

(51) Int. Cl.
*F01M 13/00* (2006.01)
(52) U.S. Cl. ...................................................... 123/472
(58) Field of Classification Search .......... 123/572–574, 123/41.86
See application file for complete search history.

(56) References Cited

U.S. PATENT DOCUMENTS

| 2003/0106543 | A1* | 6/2003 | Gschwindt et al. ............ 123/572 |
| 2009/0025662 | A1* | 1/2009 | Herman et al. ............. 123/41.86 |

(Continued)

FOREIGN PATENT DOCUMENTS

JP      A-55-43221      3/1980

(Continued)

OTHER PUBLICATIONS

Japanese Office Action issued in Japanese Patent Application No. 2008-157766 dated Sep. 6, 2011.

*Primary Examiner* — M. McMahon

(74) *Attorney, Agent, or Firm* — Oliff & Berridge, PLC

(57) ABSTRACT

A blowby gas returning apparatus is mounted in an engine provided with a turbocharger in an intake passage and provided with a blowby gas returning passage for flowing blowby gas generated in the engine to return to the engine. This apparatus comprises an intake bypass passage connecting an upstream side and a downstream side of the intake passage with respect to the turbocharger, and a jet pump for generating negative pressure in the intake bypass passage. An exit of the first blowby gas returning passage is connected to the intake bypass passage through the jet pump. The apparatus further includes a second blowby gas returning passage connecting the intake passage downstream of the throttle valve to a head cover. In the head cover, a PCV valve is placed at an entrance of the second blowby gas returning passage.

20 Claims, 9 Drawing Sheets

U.S. PATENT DOCUMENTS

2009/0223498 A1* 9/2009 Shieh ............................ 123/574
2009/0293852 A1* 12/2009 Frick et al. .................... 123/573

FOREIGN PATENT DOCUMENTS

| JP | U-56-99046 | 8/1981 |
| JP | U-62-117212 | 7/1987 |
| JP | U-63-158516 | 10/1988 |
| JP | A-64-24106 | 1/1989 |
| JP | A-2008-95528 | 4/2008 |
| JP | A-2008-111422 | 5/2008 |

* cited by examiner

BLOWBY GAS RETURNING APPARATUS

CROSS-REFERENCE TO RELATED APPLICATIONS

This application is based upon and claims the benefit of priority from each of the prior Japanese Patent Application No. 2008-157766 filed on Jun. 17, 2008, the entire contents of which are incorporated herein by reference.

Technical Field

The present invention relates to a blowby gas returning apparatus to be mounted in an engine provided with a turbocharger or supercharger in an intake passage to return blowby gas that occurs in the engine to the engine via the intake passage.

Background Art

As this type of technique, heretofore, there are known techniques disclosed in JP2008-95528A, JP2008-111422A, JP64(1989)-24106A, JP63(1988)-158516U, and JP56(1981)-99046U. Particularly, a blowby gas returning apparatus disclosed in JP2008-95528A is arranged such that a turbocharger is placed in an intake passage of an engine. A first blowby gas returning passage is placed between the intake passage downstream of the turbocharger and a crank case of the engine. During non-operation of the turbocharger, the negative pressure generated in the intake passage causes blowby gas to be led out of the crank case into the intake passage through the first blowby gas returning passage, thereby returning the blowby gas to the engine. On the other hand, a second blowby gas returning passage is placed between the intake passage upstream of the turbocharger and the crank case. A fresh-air introduction passage for introducing fresh air into a head cover is disposed between the intake passage upstream of an exit of the second blowby gas returning passage and the head cover of the engine. A filter is placed in the intake passage disposed between an entrance of the fresh-air introduction passage and the exit of the second blowby gas returning passage. During operation of the turbocharger, this filter generates a pressure difference between the entrance of the fresh-air introduction passage and the exit of the second blowby gas returning passage to introduce blowby gas out of the crank case into the intake passage, thereby returning the blowby gas to the engine.

However, in the blowby gas returning apparatus disclosed in JP2008-95528A, when a blowby gas returning flow rate is to be increased during operation of the turbocharger, the pressure difference between the entrance of the fresh-air introduction passage and the exit of the second blowby gas returning passage has to be increased. In this case, it is necessary to change a filter configuration for example by increasing a filter density. Furthermore, the increased filter density will increase intake resistance in the intake passage, resulting in a problem that affects engine operation.

SUMMARY OF INVENTION

Technical Problem

The present invention has been made in consideration of the above circumstances and has a purpose to provide a blowby gas returning apparatus for returning blowby gas to an engine without increasing intake resistance during operation of a turbocharger or supercharger and for increasing a blowby gas returning flow rate according to an increase in boost pressure or supercharging pressure.

Solution to Problem

To achieve the above purpose, one aspect of the present invention provides a blowby gas returning apparatus to be mounted in an engine provided with a turbocharger in an intake passage, the blowby gas returning apparatus comprising a blowby gas returning passage for allowing blowby gas generated in the engine to flow to the intake passage to return to the engine, the apparatus comprising: a bypass passage connecting an upstream side and a downstream side of the intake passage with respect to the turbocharger; a jet pump for generating negative pressure in the bypass passage, wherein the blowby gas returning passage includes an exit through which the blowby gas is introduced out, the exit being connected to the bypass passage through the jet pump.

Advantageous Effects of Invention

According to the present invention, it is possible to return blowby gas to an engine without increasing intake resistance during operation of a turbocharger and to increase a blowby gas returning flow rate according to an increase in boost pressure.

DESCRIPTION OF EMBODIMENTS

First Embodiment

A detailed description of a first preferred embodiment of a blowby gas returning apparatus embodying the present invention will now be given referring to the accompanying drawings.

Figure 1:
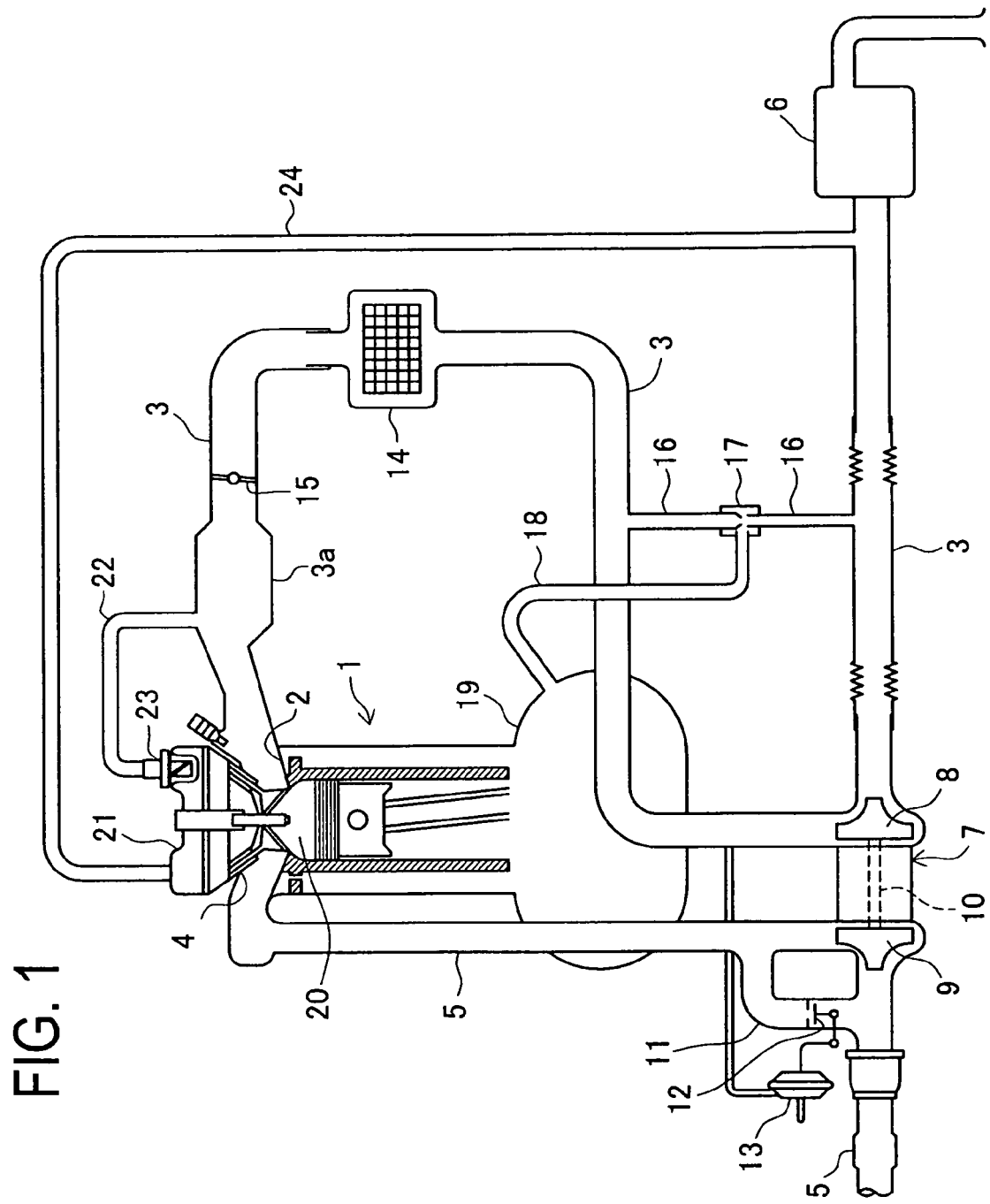
FIG. 1 is a schematic configuration view showing an engine system including a blowby gas returning apparatus in a first embodiment.

FIG. 1 is a schematic configuration view of an engine system including a blowby gas returning apparatus in this embodiment. This engine system includes a reciprocal engine 1 having an intake port 2 connected to an intake passage 3 and an exhaust port 4 connected to an exhaust passage 5. At an entrance of the intake passage 3, an air cleaner 6 is placed. A turbocharger 7 is placed between the intake passage 3 downstream of the air cleaner 6 and the exhaust passage 5 to increase intake pressure in the intake passage 3.

The turbocharger 7 includes a compressor 8 disposed in the intake passage 3, a turbine 9 disposed in the exhaust passage 5, and a rotation shaft 10 connecting the compressor 8 and the turbine 9 to integrally rotate them. The turbocharger 7 is arranged such that the turbine 9 is rotated by exhaust gas flowing in the exhaust passage 5 and the compressor 8 is integrally rotated through the rotation shaft 10, thereby increasing intake pressure in the intake passage 3, that is, supercharging the engine.

The exhaust passage 5 is provided with an exhaust bypass passage 11 at a position adjacent to the turbocharger 7 to bypass the turbine 9. In this exhaust bypass passage 11, a west gate valve 12 is mounted. An opening degree of this west gate valve 12 is adjusted by a diaphragm actuator 13. When exhaust gas flowing in the exhaust bypass passage 11 is adjusted by the west gate valve 12, a flow rate of exhaust gas to be supplied to the turbine 9 is adjusted, thereby controlling the rotation speed of the turbine 9 and the compressor 8. Thus, the boost pressure to be generated by the turbocharger 7 is adjusted.

In the intake passage 3, an intercooler 14 is placed between the compressor 8 of the turbocharger 7 and the engine 1. This intercooler 14 is to cool the intake air of which pressure has been increased by the compressor 8 to an appropriate temperature. A surge tank 3a is formed in the intake passage 3 between the intercooler 14 and the engine 1. A throttle valve 15 is mounted upstream of the surge tank 3a.

Figure 2:
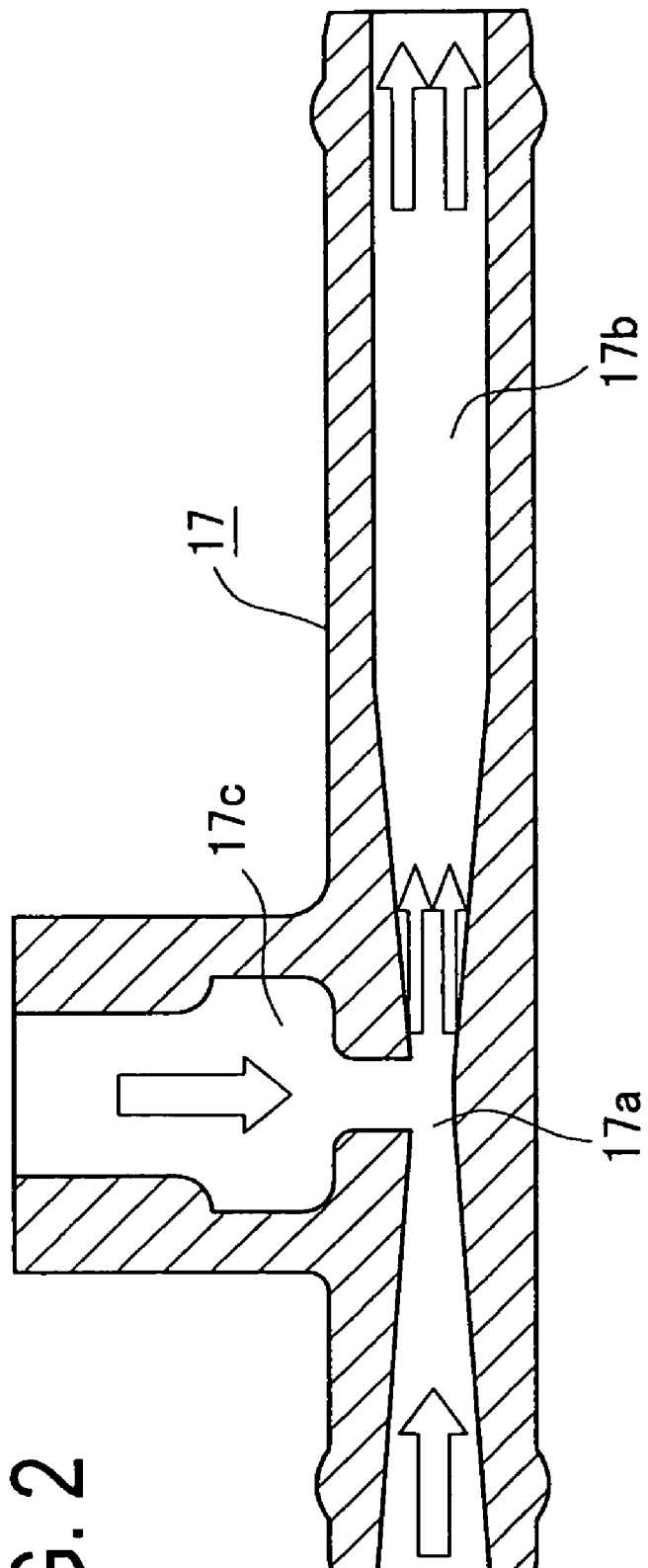
FIG. 2 is a schematic sectional view of a jet pump in the first embodiment.

An upstream side and a downstream side of the intake passage 3 with respect to the turbocharger 7 are connected to each other by an intake bypass passage 16. Specifically, the intake bypass passage 16 for bypassing the compressor 8 is provided between the downstream side of the intake passage 3 located close to the compressor 8 at which the boost pressure is high and the upstream side of the intake passage 3 with respect to the compressor 8. In this intake bypass passage 16, a jet pump 17 is placed to generate negative pressure by the air flowing in the passage 16. FIG. 2 is a sectional view showing a schematic configuration of the jet pump 17. The jet pump 17 includes a nozzle 17a formed at an air inlet side, a diffuser 17b formed at an air outlet side, and a decompression chamber 17c formed between the nozzle 17a and the diffuser 17b. The jet pump 17 generates negative pressure in the decompression chamber 17c by the air injected from the nozzle 17a. Specifically, during operation of the turbocharger 7, the pressure of intake air is increased by the compressor 8, thereby causing a pressure difference between the upstream side and the downstream side of the intake passage 3 with respect to the compressor 8. Therefore, different intake pressures act between the nozzle 17a and the diffuser 17b of the jet pump 17 through the intake bypass passage 16. This causes the air to be injected from the nozzle 17a to the diffuser 17b, thereby generating negative pressure in the decompression chamber 17c. The degree of this negative pressure depends on the degree of the boost pressure by the turbocharger 7.

As shown in FIG. 1, the decompression chamber 17c (see FIG. 2) of the jet pump 17 is connected to an exit of the first blowby gas returning passage 18. An entrance of this first blowby gas returning passage 18 is connected to a crank case 19 of the engine 1. The first blowby gas returning passage 18 is to allow blowby gas leaking out of a combustion chamber of the engine 1 into the crank case 19 to return to the combustion chamber 20 through the intake passage 3. During operation of the turbocharger 7, accordingly, negative pressure generated in the decompression chamber 17c of the jet pump 17 acts on the inside of the crank case 19 through the first blowby gas returning passage 18 to introduce the blowby gas out of the crank case 19 into the returning passage 18. This blowby gas will flow into the jet pump 17 and the intake bypass passage 16 and then into the intake passage 3. The blowby gas flowing in the intake passage 3 is returned to the combustion chamber 20 of the engine 1 via the compressor 8, the intake passage 3, and others.

In this embodiment, a head cover 21 of the engine 1 is connected to a second blowby gas returning passage 22 to allow the blowby gas leaking out of the combustion chamber 20 to return to the combustion chamber 20 through the intake passage 3. An exit of this second blowby gas returning passage 22 is connected to the surge tank 3a of the intake passage 3. During operation of the engine 1 and non-operation of the turbocharger 7, the inside of the surge tank 3a is in a negative pressure state, which acts on the second blowby gas returning passage 22, thereby causing the blowby gas to be introduced out of the head cover 21 into the second blowby gas returning passage 22. In the head cover 21, a PCV valve 23 is mounted at an entrance of the second blowby gas returning passage 22. This PCV valve 23 regulates a flow rate of the blowby gas to be introduced out of the head cover 21 into the second blowby gas returning passage 22.

In this embodiment, a fresh-air introduction passage 24 is arranged between the engine 1 and the intake passage 3 to introduce fresh air into the inside of the head cover 21 and the inside of the crank case 19. An entrance of this fresh-air introduction passage 24 is connected to the intake passage 3 near the air cleaner 6 and an exit of the passage 24 is connected to the head cover 21. The inside of the head cover 21 and the inside of the crank case 19 are communicated with each other through a communication passage (not shown) provided in the engine 1.

According to the blowby gas returning apparatus in this embodiment mentioned above, during operation of the engine 1 and non-operation of the turbocharger 7, the negative pressure generated on the downstream side of the throttle valve 15 in the intake passage 3 acts on the second blowby gas returning passage 22. This action of negative pressure causes the blowby gas accumulated in the inside of the head cover 21 to flow into the surge tank 3a through the second blowby gas returning passage 22. During non-operation of the turbocharger 7, accordingly, the blowby gas in the head cover 21 can be returned to the combustion chamber 20 through the second blowby gas returning passage 22 and the intake passage 3. At that time, a flow rate of the blowby gas allowed to flow from the head cover 21 into the second blowby gas returning passage 22 is adjusted to an adequate amount by the PCV valve 23.

On the other hand, during operation of the engine 1 and operation of the turbocharger 7, positive pressure is generated in the intake passage 3 on the downstream side of the turbocharger 7 in a positive pressure state. Accordingly, no negative pressure acts on the exit of the second blowby gas returning passage 22 and hence the blowby gas is not caused to be discharged from the head cover 21 into the intake passage 3 through the second blowby gas returning passage 22. At that time, an intake pressure difference occurs between the upstream side and the downstream side of the intake passage 3 with respect to the turbocharger 7 and therefore an intake pressure difference also occurs between both ends of the intake bypass passage 16. This pressure difference causes air to flow into the intake bypass passage 16 and this air flow generates negative pressure in the jet pump 17. Consequently, the negative pressure in the jet pump 17 acts on the exit of the first blowby gas returning passage 18, thus causing the blowby gas accumulated in the crank case 19 to flow into the intake passage 3 through the jet pump 17 and the intake bypass passage 16. As the boost pressure by the turbocharger 7 is increased, the pressure difference between both ends of the intake bypass passage 16 is also increased and accordingly large negative pressure is generated by the jet pump 17.

This increases the flow rate of blowby gas allowed to flow from the crank case 19 to the first blowby gas returning passage 18, thereby increasing the flow rate of blowby gas flowing into the intake passage 3. Herein, the intake bypass passage 16 is arranged to bypass a part of the intake passage 3 and thus the intake bypass passage 16 and the jet pump 17 will not influence the intake resistance in the intake passage 3. It is accordingly possible to return the blowby gas to the combustion chamber 20 without increasing the intake resistance in the intake passage 3 during operation of the turbocharger 7 and to increase the blowby gas returning flow rate according to an increase in boost pressure.

Figure 3:
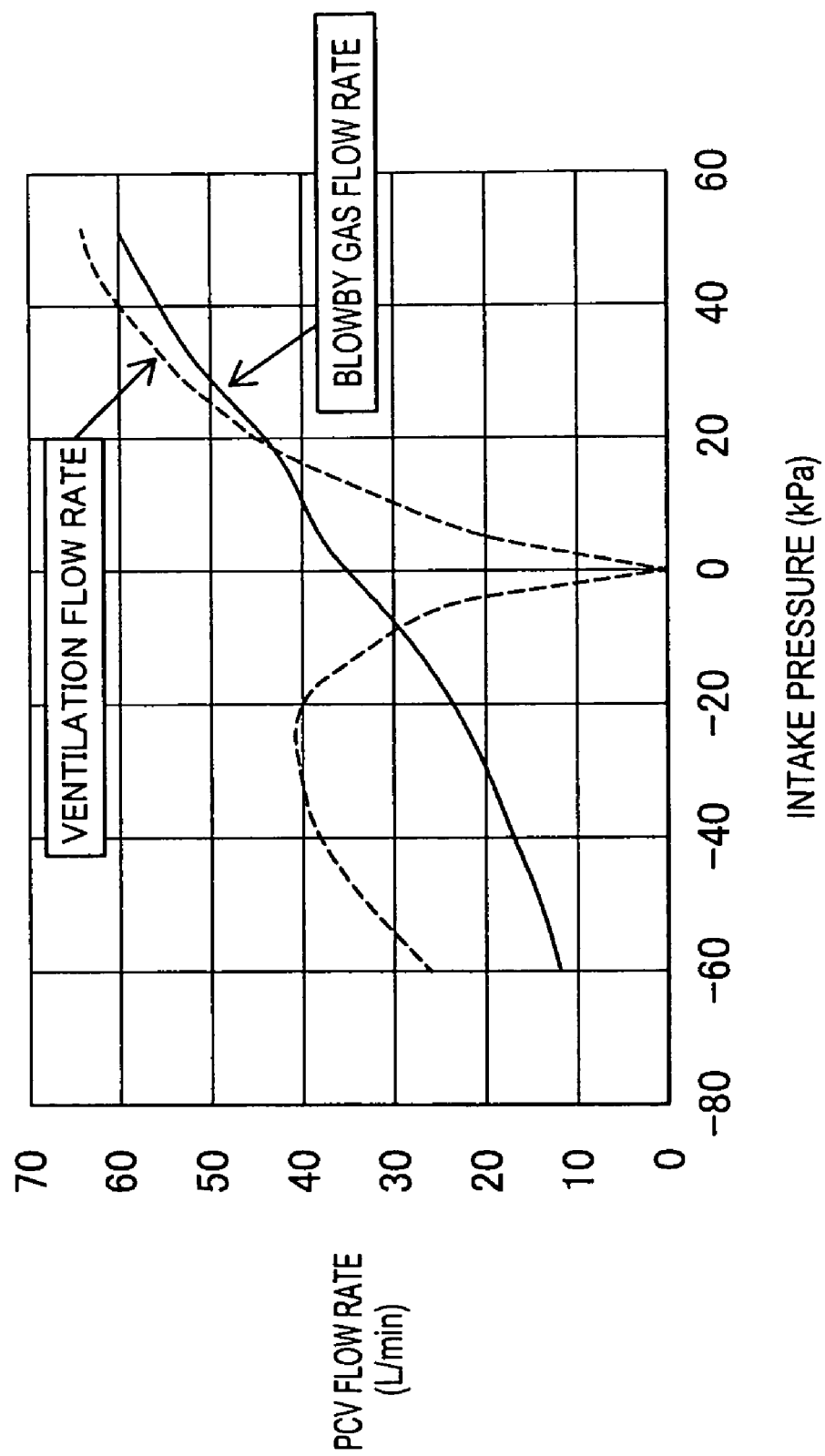
FIG. 3 is a graph showing blowby gas returning flow rate characteristics.

FIG. 3 is a graph showing bypass returning flow rate characteristics of the blowby gas returning apparatus in this embodiment. In this graph, a solid line indicates a blowby gas flow rate and a broken line indicates a ventilation flow rate of fresh air through the fresh-air introduction passage 24. As is found from this graph, during non-operation of the turbocharger 7, that is, while the intake pressure changes from "−60 to 0 (kPa)", the ventilation flow rate increases and decreases in a mountain-shaped curve in the graph. On the other hand, during operation of the turbocharger 7, that is, while the intake pressure changes from "0 to +50 (kPa)", the ventilation flow rate gradually increases. Accordingly, the blowby gas flow rate flowing to the intake passage 3 gradually increases while the intake pressure changes from "−60 to +50 (kPa)". As is found from this graph, according to this blowby gas returning apparatus, not only during non-operation of the turbocharger 7 but also during operation of the turbocharger 7, it is possible to discharge blowby gas and ventilate the engine 1. Accordingly, an oil maintenance interval of the engine 1 can be extended.

In this embodiment, since the PCV valve 23 is mounted at the entrance of the second blowby gas returning passage 22, this PCV valve 23 adjusts the flow rate of blowby gas allowed to flow into the second blowby gas returning passage 22 to a proper amount. This makes it possible to prevent excessive blowby gas from returning to the combustion chamber 20 through the second blowby gas returning passage 22.

Second Embodiment

Next, a blowby gas returning apparatus in a second embodiment according to the present invention will now be explained with reference to the accompanying drawings.

In each of the following embodiments, the same or similar components to those in the first embodiment are given the same reference signs and respective details are not repeatedly explained. The following description is made with a focus on differences from the first embodiment.

Figure 4:
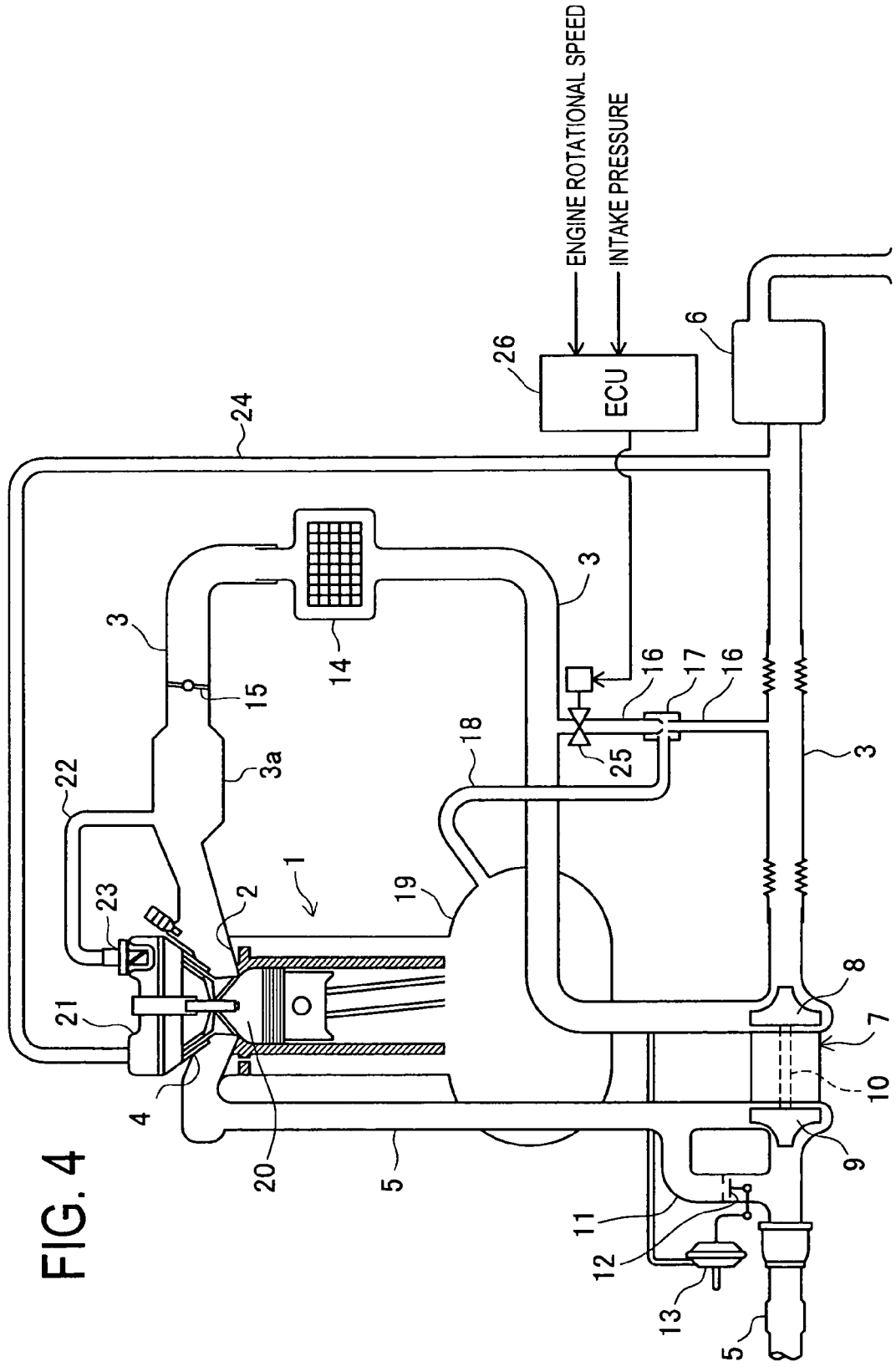
FIG. 4 is a schematic configuration view showing an engine system including a blowby gas returning apparatus in a second embodiment.

FIG. 4 is a schematic configuration view of an engine system including the blowby gas returning apparatus in this embodiment. This embodiment differs in configuration from the first embodiment in that a vacuum switching valve (VSV) 25 is placed in the intake bypass passage 16 and controlled by an electronic control unit (ECU) 26 according to an operating condition of the engine 1. Herein, the ECU 26 receives detection values of an engine rotation speed, intake pressure, etc. from various sensors (not shown) attached to the engine 1 and controls the VSV 25 based on those detection values.

Figure 5:
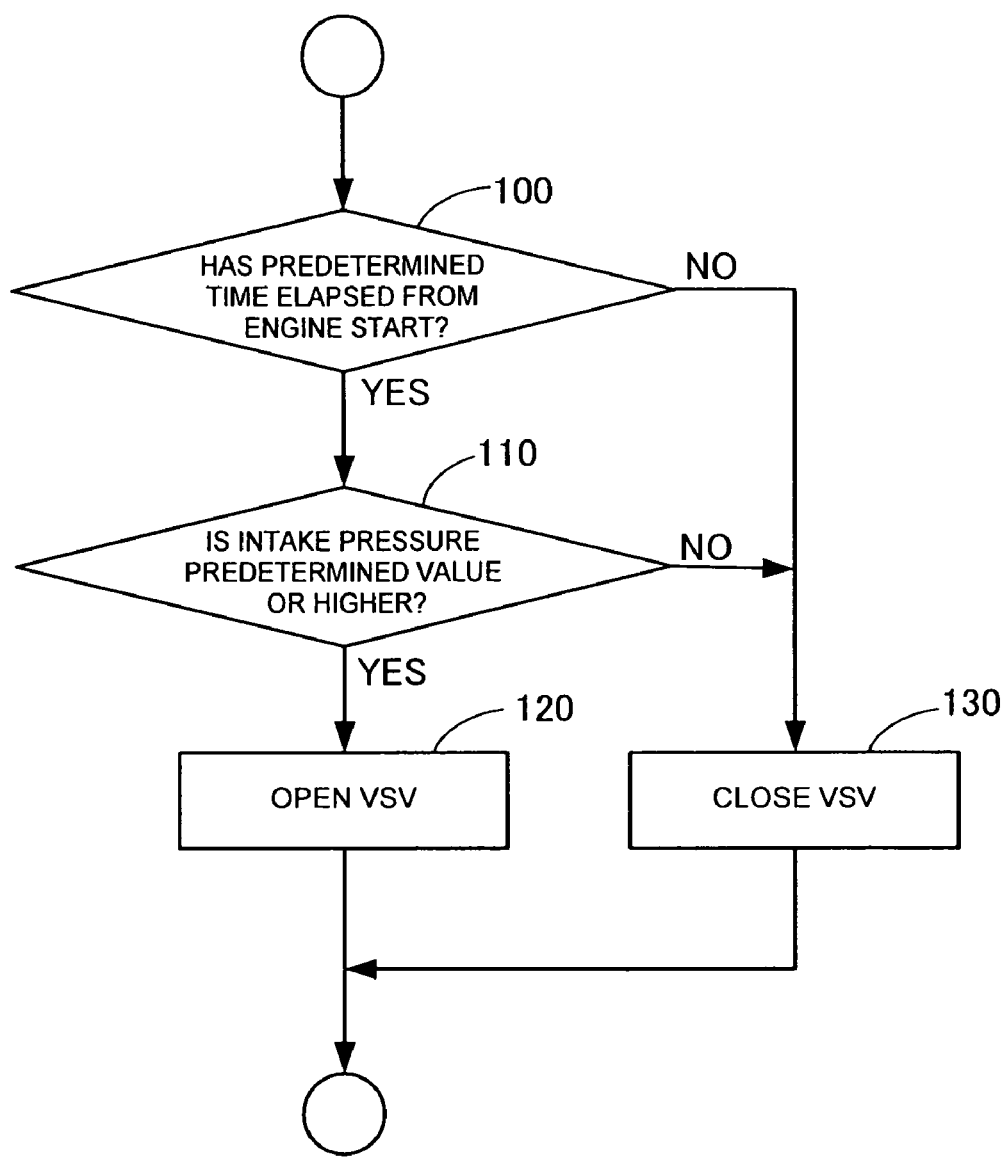
FIG. 5 is a flowchart showing a control program to be executed by an ECU in the second embodiment.

FIG. 5 is a flowchart showing a control program to be executed by the ECU 26. When the processing advances to this routine, the ECU 26 first determines in Step 100 whether or not a predetermined time has elapsed from engine start. If a negative result is obtained in this step, the ECU 26 judges that warm-up of the engine 1 is not completed yet and, in Step 130, closes the VSV 25. As a result, the VSV 25 closes the intake bypass passage 16 to shut off an air flow in the passage 16 and no negative pressure is generated by the jet pump 17.

If an affirmative result is obtained in Step 100, on the other hand, the ECU 26 determines in Step 110 whether or not the intake pressure is a predetermined value or higher. If a negative result is obtained in this step, the ECU 26 judges that the turbocharger 7 is in a non-operation state after completion of warm-up of the engine 1 and, in Step 130, closes the VSV 25 in the same way as above.

If an affirmative result is obtained in Step 110, on the other hand, the ECU 26 judges that the turbocharger 7 is in an operation state after completion of warm-up of the engine 1. The ECU 26 then opens the VSV 25 in Step 120. Thus, the VSV 25 opens the intake bypass passage 16 to allow air to flow into the intake bypass passage 16 according to the boost pressure. In the jet pump 17, accordingly, negative pressure occurs in the jet pump 17 according to the degree of the boost pressure. Accordingly, the blowby gas is discharged from the crank case 19 into the blowby gas returning passage 18 and then returned to the combustion chamber 20 via the jet pump 17, the intake bypass passage 16, the intake passage 3, and others.

In this embodiment, consequently, when the intake bypass passage 16 is opened by the VSV 25 according to the operating condition of the engine 1, air is allowed to flow into the intake bypass passage 16, so that negative pressure is generated by the jet pump 17. On the other hand, when the intake bypass passage 16 is closed by the VSV 25 according to the operating condition of the engine 1, the air flow in the intake bypass passage 16 is shut off and therefore no negative pressure is generated in the jet pump 17. According to the operating condition of the engine 1, i.e., according to need, the blowby gas is allowed to selectively flow from the crank case 19 into the intake bypass passage 16 through the first blowby gas returning passage 18 to return to the combustion chamber 20. Other operations and effects are basically the same as those in the first embodiment.

Third Embodiment

A blowby gas returning apparatus in a third embodiment according to the present invention will now be explained in detail with reference to the accompanying drawing.

Figure 6:
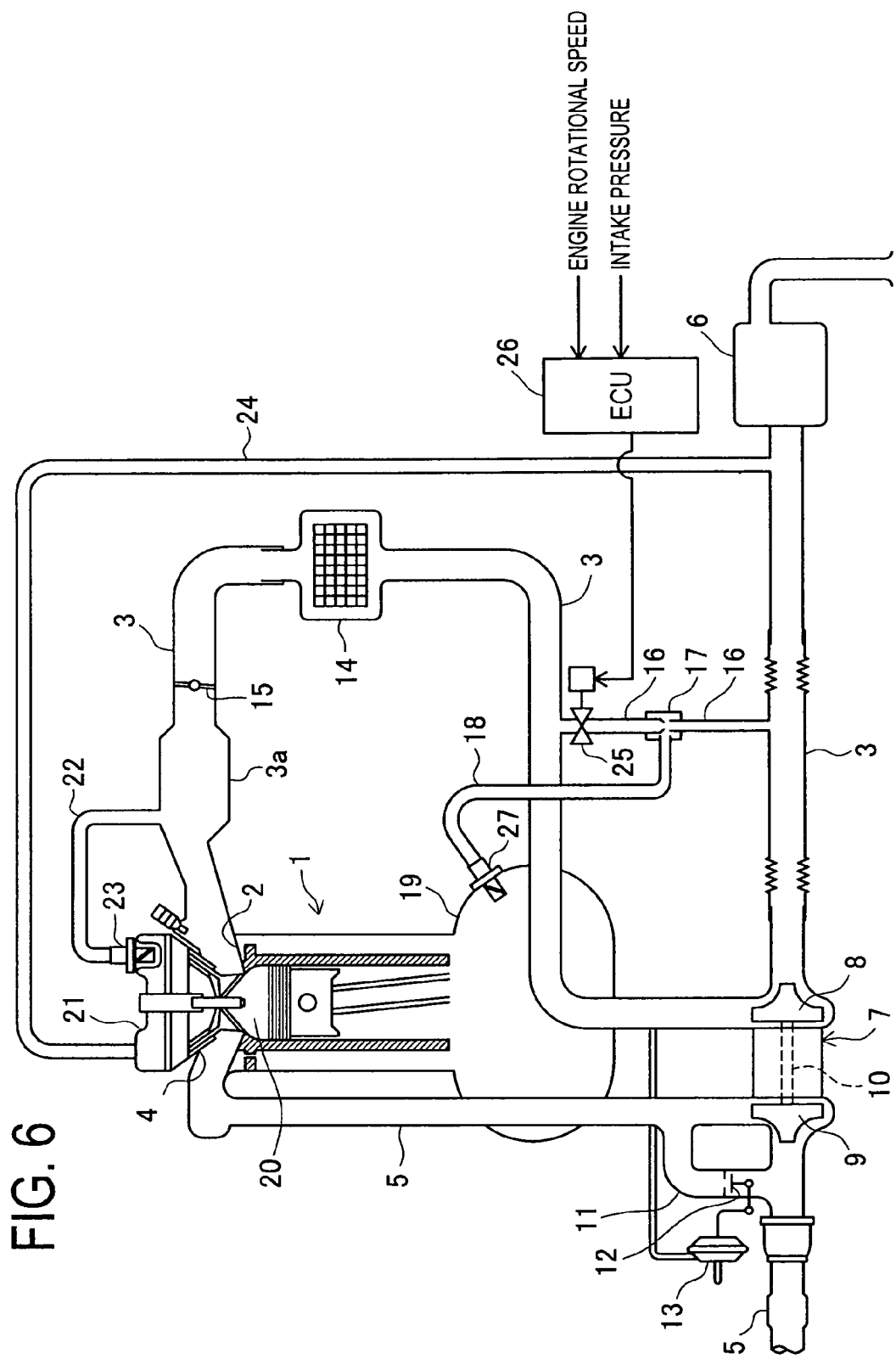
FIG. 6 is a schematic configuration view showing an engine system including a blowby gas returning apparatus in a third embodiment.

FIG. 6 is a schematic configuration view of an engine system including the blowby gas returning apparatus in this embodiment. This embodiment differs in configuration from the second embodiment in that the first blowby gas returning passage 18 is also provided with a PCV valve 27. Specifically, the crank case 19 is provided with the PCV valve 27 is provided at the entrance of the first blowby gas returning passage 18.

According to the blowby gas returning apparatus in this embodiment, the PCV valve 27 adjusts the flow rate of blowby gas allowed to flow from the crank case 19 into the first blowby gas returning passage 18 toward the jet pump 17. This makes it possible to prevent excessive blowby gas from returning to the combustion chamber 20 through the first blowby gas returning passage 18. Other operations and effects are basically the same as those in the second embodiment.

Fourth Embodiment

A blowby gas returning apparatus in a fourth embodiment according to the present invention will be explained below in detail with reference to the accompanying drawing.

Figure 7:
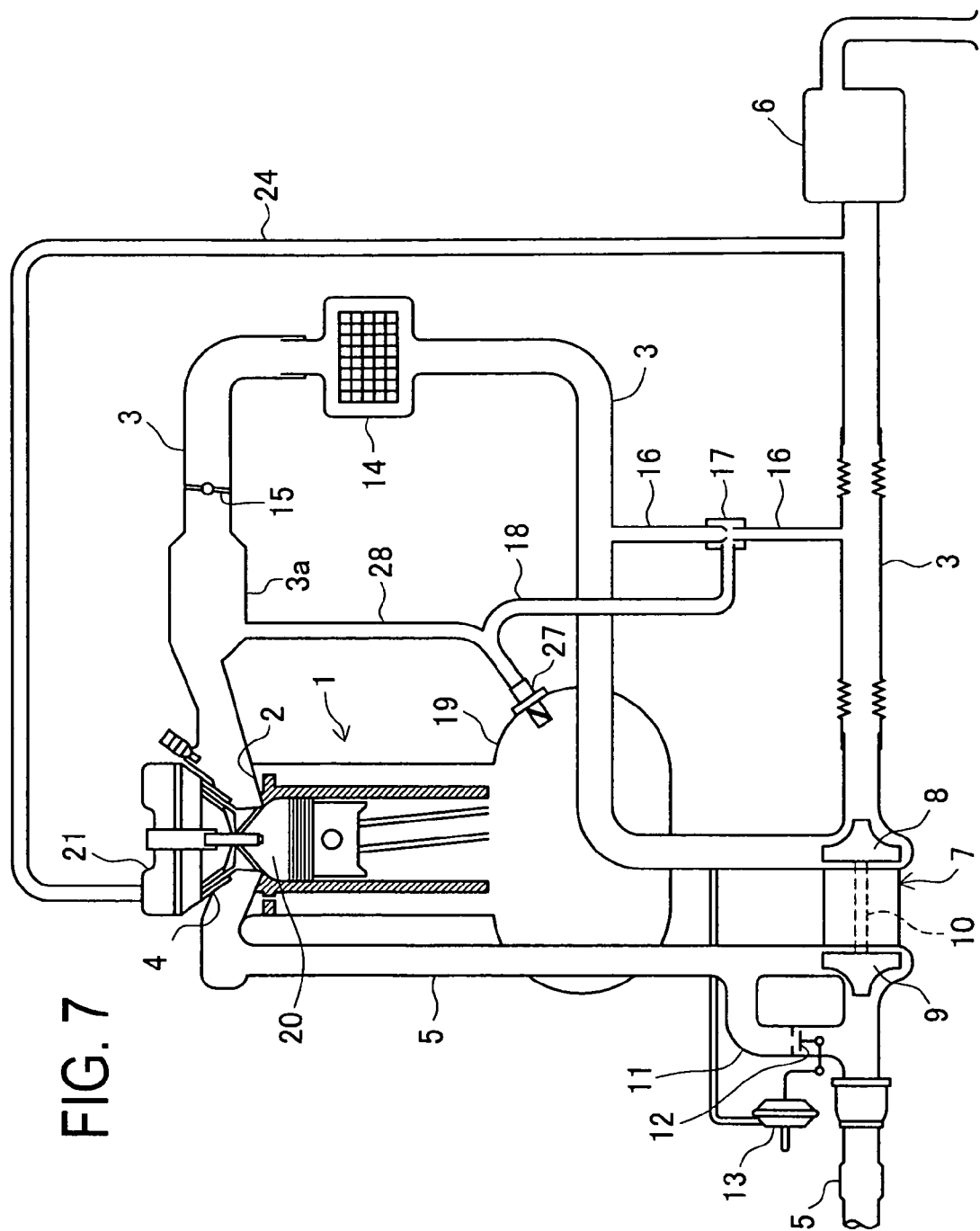
FIG. 7 is a schematic configuration view showing an engine system including a blowby gas returning apparatus in a fourth embodiment.

FIG. 7 is a schematic configuration view of an engine system including the blowby gas returning apparatus in this embodiment. This embodiment differs in configuration from the first embodiment in that the second blowby gas returning passage 22 and the PCV valve 23 are eliminated and instead a PCV valve 27 is mounted at the entrance of the first blowby gas returning passage 18 connected to the crank case 19, and a branch passage 28 is formed to branch off from the first blowby gas returning passage 18 and an exit of the branch passage 28 is connected to the surge tank 3a. This branch passage 28 is also used as the blowby gas returning passage.

According to the blowby gas returning apparatus in this embodiment, during non-operation of the turbocharger 7, negative pressure in the intake passage 3 acts on the branch passage 28 of the first blowby gas returning passage 18. By action of this negative pressure, blowby gas is caused to flow from the crank case 19 into the surge tank 3a through the first blowby gas returning passage 18 and the branch passage 28, so that the blowby gas is returned to the combustion chamber 20. During operation of the turbocharger 7, on the other hand, negative pressure is generated in the jet pump 17, thereby causing blowby gas to flow from the crank case 19 into the intake passage 3 through the PCV valve 27, the first blowby gas returning passage 18, the jet pump 17, and the intake bypass passage 16, so that the blowby gas is returned to the combustion chamber 20. Consequently, the same operations and effects as those in the first embodiment can be provided.

Fifth Embodiment

A blowby gas returning apparatus in a fifth embodiment according to the present invention will be described below in detail with reference to the accompanying drawing.

Figure 8:
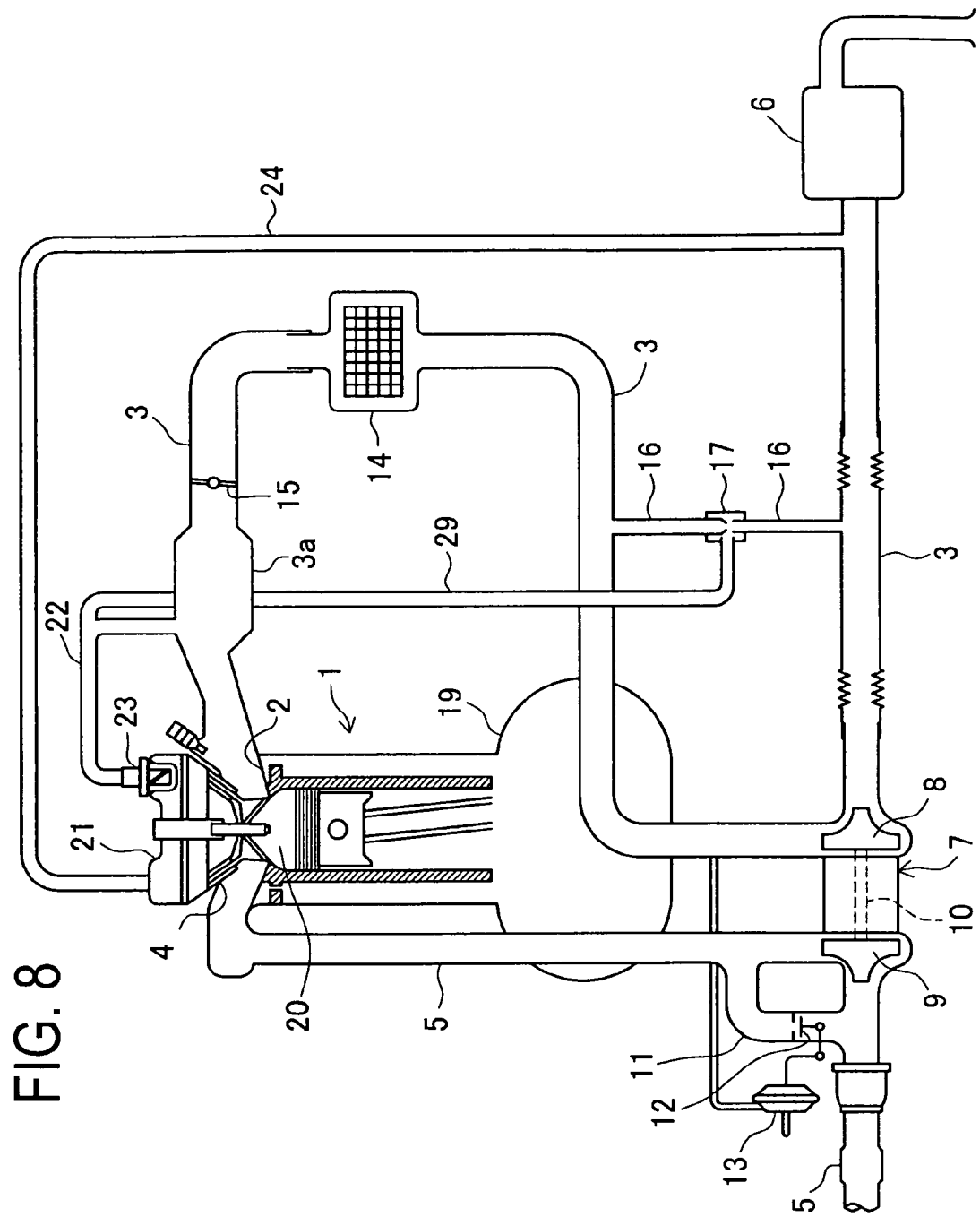
FIG. 8 is a schematic configuration view showing an engine system including a blowby gas returning apparatus in a fifth embodiment.

FIG. 8 is a schematic configuration view of an engine system including the blowby gas returning apparatus in this embodiment. This embodiment differs in configuration from the first embodiment in that the first blowby gas returning passage 18 is eliminated and instead a branch passage 29 is formed to branch off the second blowby gas returning passage 22 connected to the head cover 21 through the PCV valve 23 and an exit of the branch passage 29 is connected to the jet pump 17. The branch passage 29 is also used as the blowby gas returning passage.

According to the blowby gas returning apparatus in this embodiment, during non-operation of the turbocharger 7, negative pressure in the intake passage 3 acts on the exit of the second blowby gas returning passage 22. By this action of negative pressure, the blowby gas is caused to flow from the head cover 21 into the surge tank 3a through the PCV valve 23 and the second blowby gas returning passage 22, so that the blowby gas is returned to the combustion chamber 20. During operation of the turbocharger 7, on the other hand, when negative pressure is generated in the jet pump 17, causing the blowby gas to flow from the head cover 21 into the intake passage 3 through the PCV valve 23, the second blowby gas returning passage 22, the branch passage 29, the jet pump 17, and the intake bypass passage 16, so that the blowby gas is returned to the combustion chamber 20. Consequently, the same operations and effects as those in the first embodiment can be provided.

The present invention is not limited to the aforementioned embodiments and may be embodied in other specific forms without departing from the essential characteristics thereof.

For instance, in the first embodiment, the crank case 19 is not provided with a PCV valve at the entrance of the blowby gas returning passage 18 but it may include a PCV valve at the entrance.

Figure 9:
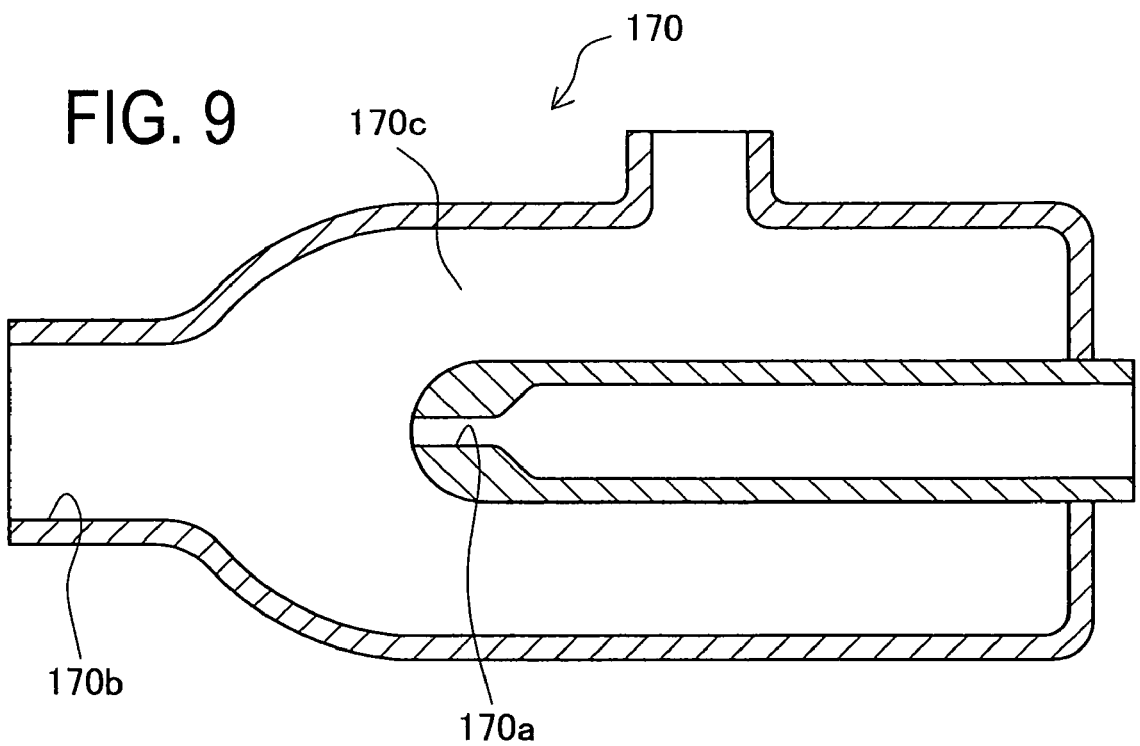
FIG. 9 is a sectional view showing a schematic configuration of a jet pump used instead of the jet pump shown in FIG. 2.

The aforementioned embodiments use the jet pump 17 shown in FIG. 2 and, alternately, may use a jet pump 170 shown in FIG. 9. The jet pump 170 in FIG. 9 includes a nozzle 170a formed at an air inlet side, a diffuser 170b formed at an air outlet side, and a decompression chamber 170c formed to surround the outer periphery of the nozzle 170a. When compressed air is injected from the nozzle 170a, entraining the air in the decompression chamber 170c, the air is injected from the diffuser 170b.

Industrial Applicability

The present invention can be utilized in an engine provided with a turbocharger.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

1 Engine
3 Intake passage
3a Surge tank
7 Turbocharger
8 Compressor
9 Turbine
15 Throttle valve
16 Intake bypass passage
17, 170 Jet pump
18 First blowby gas returning passage
19 Crank case
20 Combustion chamber
21 Head cover
22 Second blowby gas returning passage
23 PCV valve
25 VSV
27 PCV valve

The invention claimed is:

1. A blowby gas returning apparatus to be mounted in an engine provided with a turbocharger in an intake passage, the blowby gas returning apparatus comprising a blowby gas returning passage for allowing blowby gas generated in the engine to flow to the intake passage to return to the engine, the apparatus comprising:
a bypass passage connecting an upstream side and a downstream side of the intake passage with respect to the turbocharger;
a jet pump for generating negative pressure in the bypass passage,
wherein the blowby gas returning passage includes an exit through which the blowby gas is introduced out, the exit being connected to the bypass passage through the jet pump.

2. The blowby gas returning apparatus according to claim 1, wherein a throttle valve is placed in the intake passage downstream of the turbocharger, the apparatus further comprises a second blowby gas returning passage for flowing blowby gas from the engine to the intake passage to return the blowby gas to the engine, and the second blowby gas returning passage includes an exit through which the blowby gas is introduced out, and the exit is connected to the intake passage downstream of the throttle valve.

3. The blowby gas returning apparatus according to claim 1, further comprising an opening and closing valve for opening and closing the bypass passage.

4. The blowby gas returning apparatus according to claim 2, further comprising an opening and closing valve for opening and closing the bypass passage.

5. The blowby gas returning apparatus according to claim 1, further comprising:
   an opening and closing valve for opening and closing the bypass passage; and
   a control device for controlling the opening and closing valve,
   wherein the control device controls the opening and closing valve according to an operating condition of the engine.

6. The blowby gas returning apparatus according to claim 2, further comprising:
   an opening and closing valve for opening and closing the bypass passage; and
   a control device for controlling the opening and closing valve,
   wherein the control device controls the opening and closing valve according to an operating condition of the engine.

7. The blowby gas returning apparatus according to claim 1, wherein
   a throttle valve is placed in the intake passage downstream of the turbocharger,
   the blowby gas returning passage includes an entrance through which the blowby gas is introduced into the blowby gas returning passage, the entrance being connected to a crank case of the engine,
   the blowby gas returning passage includes a branch passage formed to branch off from the blowby gas returning passage, the branch passage including an exit through which the blowby gas is introduced out of the branch passage, and
   the exit of the branch passage for returning the blowby gas from the crank case to the engine is connected to the intake passage downstream of the throttle valve.

8. The blowby gas returning apparatus according to claim 1, wherein
   a throttle valve is placed in the intake passage downstream of the turbocharger,
   the blowby gas returning passage includes an entrance through which the blowby gas is introduced into the blowby gas returning passage, the entrance being connected to a head cover of the engine,
   the blowby gas returning passage includes a branch passage formed to branch off from the blowby gas returning passage, the branch passage including an exit through which the blowby gas is introduced out of the branch passage, and
   the exit of the branch passage is connected to the intake passage downstream of the throttle valve.

9. The blowby gas returning apparatus according to claim 1, wherein the blowby gas returning passage is provided with a blowby gas flow rate adjustment valve for adjusting a blowby gas flow rate.

10. The blowby gas returning apparatus according to claim 2, wherein at least one of the blowby gas returning passage and the second blowby gas returning passage is provided with a blowby gas flow adjustment valve for adjusting a blowby gas flow rate.

11. The blowby gas returning apparatus according to claim 3, wherein the blowby gas returning passage is provided with a blowby gas flow rate adjustment valve for adjusting a blowby gas flow rate.

12. The blowby gas returning apparatus according to claim 4, wherein the blowby gas returning passage is provided with a blowby gas flow rate adjustment valve for adjusting a blowby gas flow rate.

13. The blowby gas returning apparatus according to claim 5, wherein the blowby gas returning passage is provided with a blowby gas flow rate adjustment valve for adjusting a blowby gas flow rate.

14. The blowby gas returning apparatus according to claim 6, wherein the blowby gas returning passage is provided with a blowby gas flow rate adjustment valve for adjusting a blowby gas flow rate.

15. The blowby gas returning apparatus according to claim 7, wherein the blowby gas returning passage is provided with a blowby gas flow rate adjustment valve for adjusting a blowby gas flow rate.

16. The blowby gas returning apparatus according to claim 8, wherein the blowby gas returning passage is provided with a blowby gas flow rate adjustment valve for adjusting a blowby gas flow rate.

17. The blowby gas returning apparatus according to claim 1, wherein
   the jet pump includes a nozzle provided at an air inlet side, a diffuser provided at an air outlet side, and a decompression chamber provided between the nozzle and the diffuser,
   the jet pump generates negative pressure in the decompression chamber by air injected from the nozzle, and
   the decompression chamber is connected to the exit of the blowby gas returning passage.

18. The blowby gas returning apparatus according to claim 2, wherein
   the jet pump includes a nozzle provided at an air inlet side, a diffuser provided at an air outlet side, and a decompression chamber provided between the nozzle and the diffuser,
   the jet pump generates negative pressure in the decompression chamber by air injected from the nozzle, and
   the decompression chamber is connected to the exit of the blowby gas returning passage.

19. The blowby gas returning apparatus according to claim 5, wherein
   the jet pump includes a nozzle provided at an air inlet side, a diffuser provided at an air outlet side, and a decompression chamber provided between the nozzle and the diffuser,
   the jet pump generates negative pressure in the decompression chamber by air injected from the nozzle, and
   the decompression chamber is connected to the exit of the blowby gas returning passage.

20. The blowby gas returning apparatus according to claim 6, wherein
   the jet pump includes a nozzle provided at an air inlet side, a diffuser provided at an air outlet side, and a decompression chamber provided between the nozzle and the diffuser,
   the jet pump generates negative pressure in the decompression chamber by air injected from the nozzle, and
   the decompression chamber is connected to the exit of the blowby gas returning passage.

* * * * *